United States Patent [19]

Tashiro

[11] Patent Number: 4,734,024
[45] Date of Patent: Mar. 29, 1988

[54] APPARATUS FOR SHAPING A SPHERICAL BODY

[75] Inventor: Yasunori Tashiro, Utsunomiya, Japan

[73] Assignee: Rheon Automatic Machinery Co., Ltd., Japan

[21] Appl. No.: 900,074

[22] Filed: Aug. 9, 1986

[30] Foreign Application Priority Data

Jan. 16, 1986 [JP] Japan .................................. 61-6925
Feb. 11, 1986 [JP] Japan .................................. 61-27587

[51] Int. Cl.⁴ ............................................... A21C 3/10
[52] U.S. Cl. ..................................... 425/132; 425/142; 425/287; 425/308; 425/466; 426/503; 426/516
[58] Field of Search ............... 425/287, 406, 466, 132, 425/142, 308; 426/503, 516

[56] References Cited

U.S. PATENT DOCUMENTS

| 2,578,229 | 12/1951 | Clement et al. | 425/466 |
| 3,901,641 | 8/1975 | Onder | 425/406 |
| 4,251,201 | 2/1981 | Kripiak | 425/132 |

Primary Examiner—Jay H. Woo
Assistant Examiner—C. S. Bushey
Attorney, Agent, or Firm—Guy W. Shoup

[57] ABSTRACT

An apparatus for shaping a spherical body consisting of dough crust and a filling is provided. A continuously fed cylindrical body, consisting of dough crust and a filling, is constricted by at least three slidable members which form an opening or closes it. The members slide on each other so as to constrict the cylindrical body. The contact area of the members with the surface of the cylindrical body gradually decreases as the opening is closed, thereby constricting the cylindrical body and shaping the spherical body.

8 Claims, 25 Drawing Figures

1

APPARATUS FOR SHAPING A SPHERICAL BODY

BACKGROUND OF THE INVENTION

1. Field of the Invention

This invention generally relates to shaping a spherical body consisting of dough crust and a filling, and more particularly, to shaping the spherical body by constricting a continuously fed cylindrical body consisting of dough crust and a filling, without exposing or spilling the filling.

2. Prior Art

Japanese Utility Model Early-Publication No. 85178/85 discloses a cutter comprising a plurality of squeezing pieces in a guide, means to slide the squeezing pieces, whereby bar foodstuffs are cut. The object of the utility model is a cutter wherein the bar foodstuffs, consisting of a single component, are cut by the squeezing pieces. Each of the squeezing pieces preferably has at its inner end a sharp edge to smoothly cut the foodstuffs.

U.S. Pat. No. 4,251,201 discloses an extrusion apparatus wherein an iris valve closes and opens its polygonal shaped aperture to cut an extruded article consisting of a filling and a coating material.

The iris valve is composed of a plurality of circumferentially disposed leaf members, which open and close the aperture by force applied in the radial direction. The plural leaf members overlap each other to make the aperture, so that the thickness of each leaf member is necessarily limited, and the aperture cannot be completely closed. Further, as the aperture is necessarily defined by the sharp edges found by the inner ends of the thin leaf members, an article is liable to be penetrated by the leaf members as it is cut by a sharp blade. Also, an article to be cut tends to clog between the leaf members.

Furthermore, the narrowing of the aperture constricts the article by applying force toward the center of the article, while increasing the contact area of the leaf members with the article, so that in many cases the edges of the aperture are forced into the filling in the extruded article, whereby the filling is readily exposed.

Therefore, when a spherical body consisting of the crust and the filling is prepared by cutting a continuously fed material an apparatus and method has been required in which an opening completely closes, no filling or crust is liable to adhere to the cutter or between members constituting the cutter, and the filling is satisfactorily encrusted with the crust.

SUMMARY OF THE INVENTION

One object of the invention is to provide an apparatus and method by which a filler-containing cylindrical body is cut to shape a unit product consisting of a covering and a filler.

Another object of the invention is to provide an apparatus and method in which a continuously fed cylindrical body is cut while the filler remains fully encrusted by the covering, thereby continuously producing a shaped spherical body.

Still another object of the invention is to provide an apparatus and method in which a continuously fed cylindrical body is cut in a manner that no filler or crust adheres to the cutter and the operation is suited for mass production.

In accordance with a first aspect of the invention, an apparatus for shaping a round body consisting of dough crust and a filling is provided, which comprises:
  means for continuously supplying a cylindrical body consisting of dough crust and a filling,
  an assembly comprising a plurality of circumferentially disposed members combined to form an opening at the center thereof, which assembly is disposed downstream of the cylindrical body supply means,
  means for closing and opening the opening of the assembly, and
  means disposed downstream of the assembly for receiving the shaped spherical body, characterized by
  the assembly consisting of at least three horizontally disposed members, each having at least two sliding surfaces, and the members being so combined that the sliding surface of one member is slidable on a sliding surface of another member, that the opening is closed and opened by sliding the members, and that the opening is confined by walls consisting of the inwardly exposed part of the sliding surfaces of the members and is of a cross-sectional area, when the opening is fully open, enough to pass the cylindrical body, and
  means to slide the members for the closing and opening.

In another aspect of the invention, a method of shaping a spherical body consisting of dough crust and a filling is provided, which comprises:
  continuously feeding a cylindrical body consisting of dough crust and a filling, and applying constricting force to the cylindrical body from around it and perpendicularly to the axial direction thereof, characterized by
  applying force to the cylindrical body in at least three directions thereof and along the loci of the sliding movements of members horizontally aligned around the cylindrical body and made to slide on each other so as to pressingly contact and constrict the cylindrical body, while decreasing the surface area of the cylindrical body until the cylindrical body is cut.

In the invention, force is applied to the cylindrical body from at least three directions by at least three slidable members which form a cutter with an inner opening through which a cylindrical body is adapted to pass. The sliding surface of one member slides on the sliding surface of another member to contact the surface of the cylindrical body passing through the opening, thereby gradually constricting the cylindrical body to cut it.

Since the force is applied to the cylindrical body, along the loci of the sliding movements of the members, which loci are biased in a tangential direction relating to the circumference of the cylindrical body, the cylindrical body does not receive a centripetally acting force, and the dough crust tends to be brought to a portion at which the dough crust is to be cut, because of the frictional force between the sliding surfaces and the surface of the dough crust. Also, since the contact area of the sliding surfaces with the cylindrical body gradually decreases while constricting it while applying tangential force to the body, the body does not undergo force which causes the cutter to penetrate the body. The filling is readily separated in the axial direction of the cylindrical body while the dough crust does not lose its continuity and is brought to the portion at which the cylindrical body is cut. This is due to the difference between the rheological properties of the dough crust and the filling. Therefore, when the opening is completely closed, the cylindrical body is cut without exposing the filling.

DESCRIPTION OF THE PREFERRED EMBODIMENTS

An embodiment of the invention will now be described with reference to the drawings.

Figure 1:
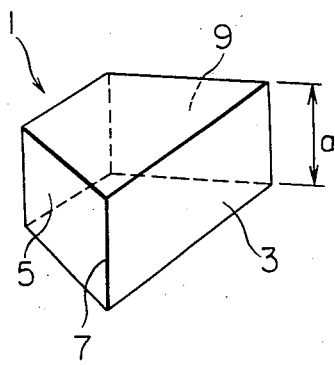
FIG. 1 is a perspective view of a member which constitutes an assembly of a first embodiment of the invention.
Figure 2A:
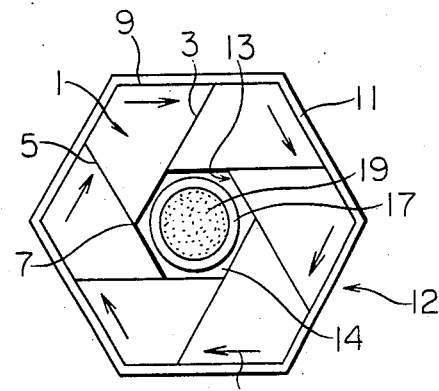
FIGS. 2(A), 3(A), and 4(A) are plan views of an assembly of the first embodiment, which is composed of a housing and a plurality of the members one of which is shown in FIG. 1 and their positional relationships before, during and after a cycle of their sliding movements.
Figure 3A:
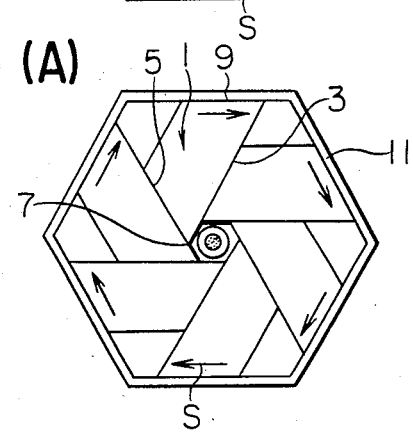
Figure 4A:
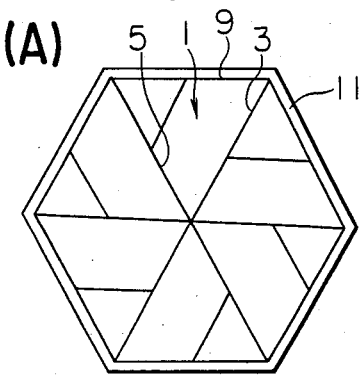
Figure 2:
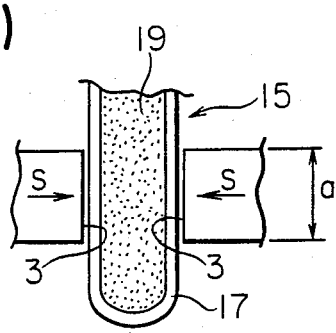
FIGS. 2(B), 3(B), and 4(B) are cross-sectional views, each corresponding to FIGS. 2(A), 3(A), and 4(A) respectively, illustrating the process of constricting a cylindrical body by the surfaces of the members of the first embodiment.
Figure 3:
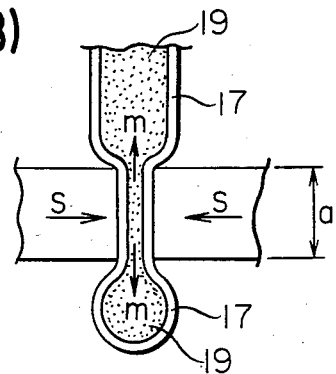
Figure 4:
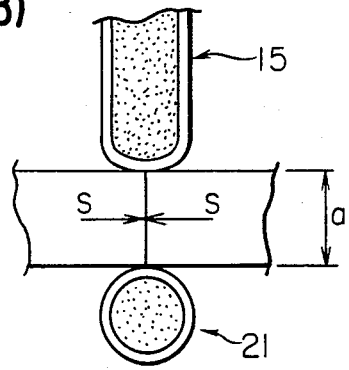
Figure 5:
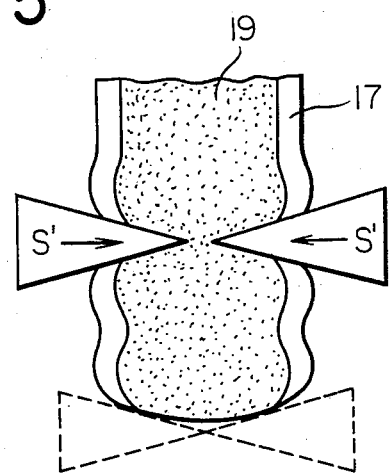
FIG. 5 illustrates a stage in the process of cutting a cylindrical body by conventional wedge-formed blades of the invention.

In FIG. 1, a member 1 of the cutter assembly is shown. The member is bexahedron with two opposing trapezoidal surfaces, which form the top and bottom surfaces, with a height of a. It has a first and second adjoining inner sliding surfaces 3 and 5, an outer sliding surface 9 all of these sliding surfaces being vertical. The two inner sliding surfaces 3 and 5 abut each other at an edge 7. When a plurality of members 1 is together to form an assembly 12 in a housing 11, as shown in FIG. 2(A), where the outer sliding surface, and another surface other than the inner sliding surfaces, are in contact with the inner wall of the housing, an opening 14, is formed surrounded by part of the inner sliding wall 3 of each member. The members 1 are slidingly moved in the direction as indicated by arrows s, by moving a pin 25 (FIG. 13) fixedly mounted on one of the members 1. When the pin 25 moves a member 1, the outer sliding surface 9 of the member slides on the inner wall of the case 11, forcing the sliding surfaces 9 of the other members to move along the inner wall of the case 11. The inwardly exposed parts of the sliding surfaces 3 establish walls 13 which confine the opening 14. The opening 14 has a cross-sectional area which, when the opening 14 is fully opened, is sufficiently wide to pass the cylindrical body 15, which consists of dough crust 17 and a filling 19. As will be understood by reviewing FIGS. 2(A), 2(B), 3(A), 3(B), 4(A), and 4(B), when the outer sliding surface 9 of each member 1 slides, the pushing member causes the second inner sliding surface 5 of the preceding member to slide on the first inner sliding surface 3, thereby causing the edge 7 to move in the inward direction. These sliding movements result in reducing the area of the opening 14. When the cylindrical body 15 extends through the opening 14, as shown in FIGS. 2(A) an 2(B), and the members 1 are caused to move in the direction s, constricting force by inwardly exposed part of the sliding surfaces 3 is applied to the cylindrical body in a circumferencially biased direction. When the members 1 are moved to the position shown in FIG. 3(A), the opening 14 is closed to the extent as shown therein and in FIG. 3(B), causing the cylindrical body 15 to be constricted accordingly. The cross-sectional conditions of the cylindrical body 15 are shown in FIGS. 2(B) and 3(B). When the members 3 slide, they come in contact with the outer surface of the cylindrical body 15 at the walls 13, i.e. the inwardly exposed part of the sliding surfaces 3, and the greater the distance of the sliding motion of each member, the more constricted the area of the outer surface of the cylindrical body 15 in contact with the walls 13. Thus, as the area of the opening decreases, the area of the walls 13 in contact with the cylindrical body 15 decreases. Due to the difference in the rheological properties of the dough crust 17 and the filling 19, the filling 19 is readily forced to move in the axial direction of the cylindrical body as indicated by arrows m. In a conventional device, as shown in FIG. 5, where wedge-formed blades are used, the blades move in the readily inward direction. In such a device, the blades intrude into the filling 19 as indicated by arrows s', while increasing the contact area of the blades with the cylindrical body.

In the invention, during the sliding movements of the members, the cylindrical body receives force along the loci of the movements of the sliding surfaces 3 in a circumferencially biased direction, so that the dough crust is brought to the center of the opening 14 and is eventually cut by the closure of the opening 14. During the process, the friction between the dough crust and the sliding surfaces induces the dough to flow in the direction s. Before the opening 14 is completely closed, the opening is filled only with the dough crust, the filling having been dislocated to either side of the opening. The cylindrical crust is finally cut as shown in FIGS. 4(A) and 4(B) and a shaped body 21 is produced.

Figure 6:
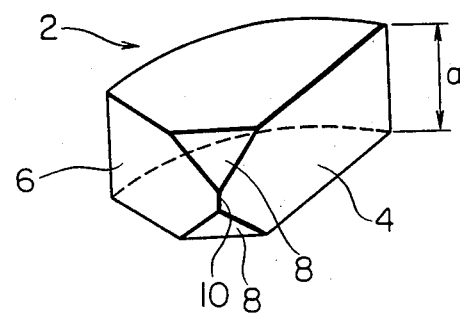
FIG. 6 is a perspective view of a member constituting an assembly of a second embodiment.
Figure 7A:
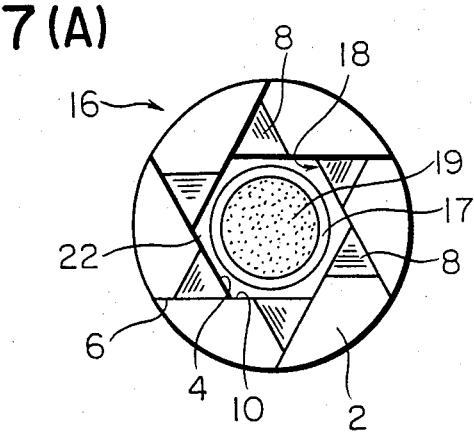
FIGS. 7(A), 8(A), and 9(A) are plan views of an assembly of the second embodiment, which is composed of a plurality of members, one of which is shown in FIG. 6, and their positional relationships before, during and after a cycle of their sliding movements.
Figure 8A:
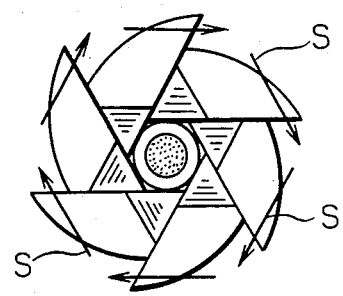
Figure 9A:
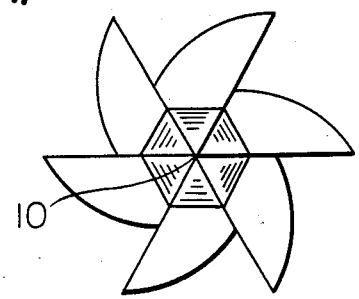
Figure 7B:
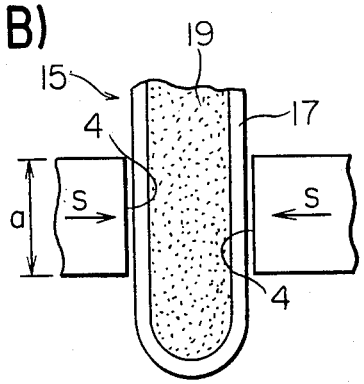
FIGS. 7(B), 8(B), and 9(B) are cross-sectional views, corresponding to FIGS. 7(A), 8(A), and 9(A), respectively, illustrating the process of constricting a cylindrical body by the surfaces of the members of the second embodiment of the invention.
Figure 8B:
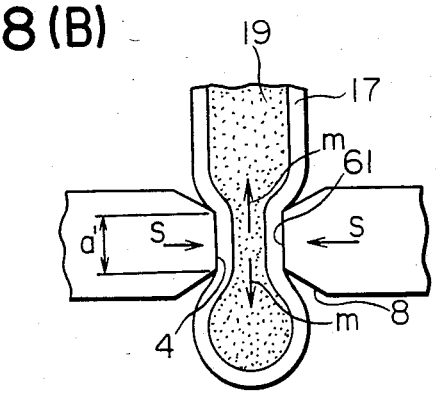
Figure 9B:
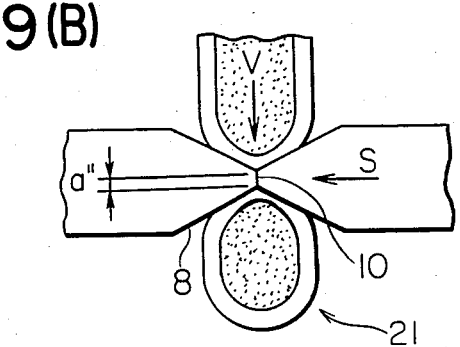

To move efficiently constrict the cylindrical body, the contact area of the sliding surfaces with the cylindrical body, when closing the opening, can be further reduced, as shown in FIG. 6, by providing a member 2 with slopes 8 at its inner end. One of the slopes 8 is formed by cutting the corner formed by the two adjoining inner sliding surfaces 4 and 6 and the top surface of the member. The other slope can be formed in the similar manner at the corner formed by the same two sliding surfaces and the bottom surface of the member. As will be understood from FIG. 6, illustrating a perspective view of the member 2, it has a sliding surface 4 with a height a, a sliding surface 6, the slopes 8, and an edge 10. These slopes 8 are negative gradient toward the inner end of the member 2. In FIG. 7(A), an assembly 16 is made by combining six members 2 to provide an opening 22, which is adapted to pass the cylindrical body 15. Although walls 18 made by the exposed part of the sliding surfaces 4 has a height a at a position where no slope is provided when the opening is fully opened as shown in FIG. 7(B), along with the progress of the sliding movement of the members 2 in the direction S, the height of the walls reduced. Since the slopes are vertically formed, the cylindrical body is surrounded by serrated walls. A cross-section of the cylindrical body and the members is shown in FIG. 8(B), wherein the height of the walls is shown as a'. The surface area of the cylindrical body 15 contacting the walls 18 decreases so that the constriction of the cylindrical body 15 by the walls 18 is smoothly made. When the opening 22 is closed, the edges 10 converge as shown in FIGS. 9(A) and 9(B), and the cylindrical body 15 is cut to shape the spherical body 21. At this time, the height of the walls 18 is reduced to a''.

Figure 10:
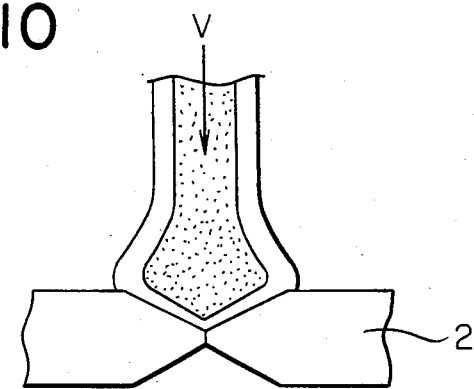
FIG. 10 illustrates an example of the swollen end of a cylindrical body at the end of the cutting operation when an assembly remains vertically stationary during the operation.

If the cylindrical body 15 is continuously fed at a speed v from a supply device and if the height of the assembly 16 is unchanged, the bottom part of the cylindrical body will swell as shown in FIG. 10. This can be avoided by lowering the assembly at the same speed v as the speed v of the cylindrical body as shown in FIG. 11.

Figure 11:
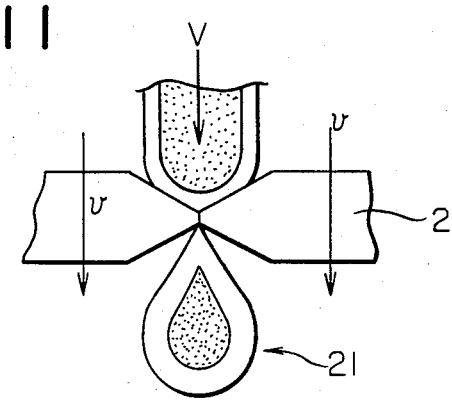
FIG. 11 illustrates an example of the shaped end of a cylindrical body when an assembly cuts it while descending at the same speed υ as the speed v of the feeding of the cylindrical body, and a shaped body underneath the cutting members, having a trailing end.
Figure 12:
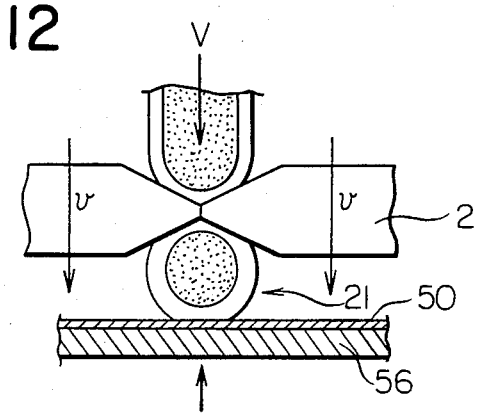
FIG. 12 illustrates the shape of the cylindrical body and the shaped spherical body when the belt of a lifted conveyor has received the spherical body.

Depending on the rheological properties of the cylindrical body, it tends to be drawn rearwardly as shown in FIG. 11. This phenomenon can also be avoided, as shown in FIG. 12, by lifting a plate 56 supporting a belt 50 for receiving the shaped spherical body, in synchronization with the shaping of the body.

An apparatus for working the aforementioned members will now be described by referring to the drawings.

Figure 13:
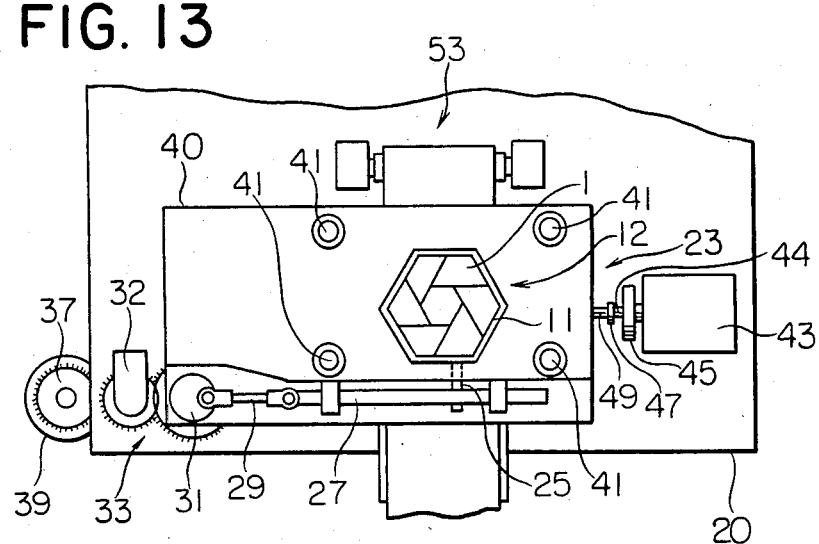
FIG. 13 is a schematic plan view of an embodiment of the invention.
Figure 14:
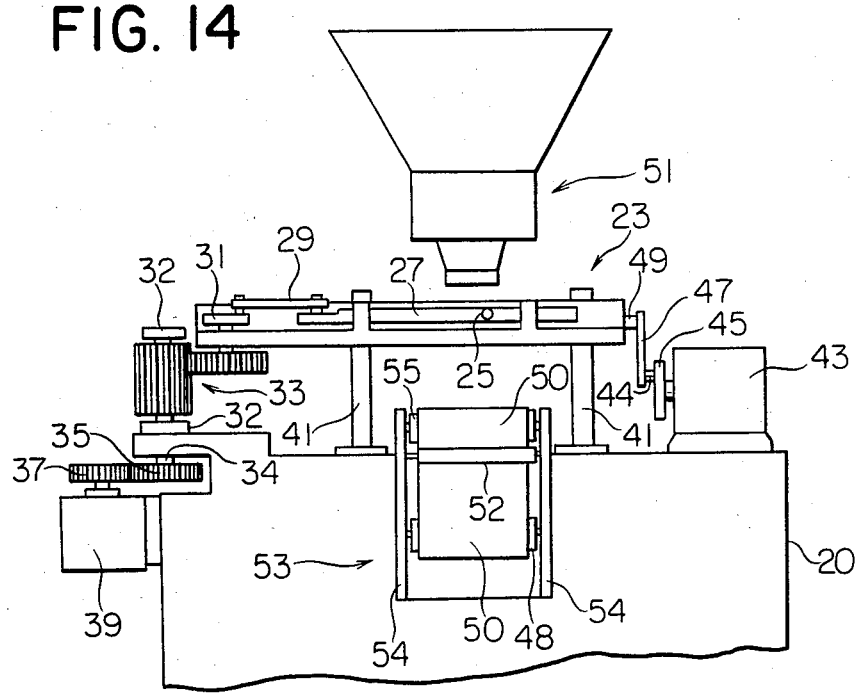
FIG. 14 is a schematic elevational view of the embodiment shown in FIG. 13.
Figure 15:
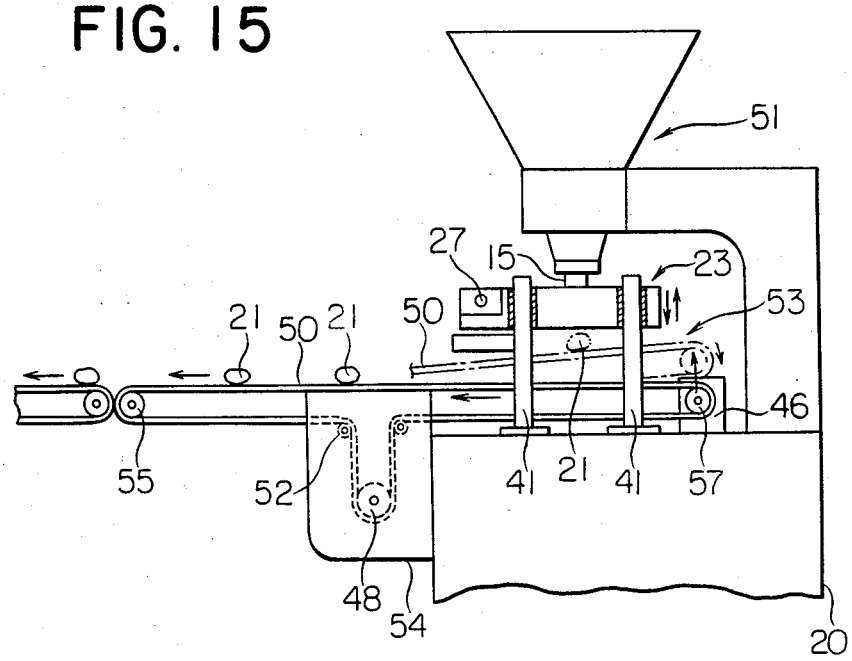
FIG. 15 is a schematic side elevational view of another embodiment of the invention.

In FIGS. 13, 14, and 15, the apparatus is composed of a base 20, a cutter device 23, a cylindrical body supply device 51, and a belt conveyor 53. The cutter device 23 comprises a frame 40, the case 11 mounted on the frame 40 and accomodating the members 1, and a slider 27. The frame 40 is adapted to slide upwards or downwards as explained later, along supporting shafts 41 which are mounted on the base 20. A pin 25 is connected at its one end, through slot formed on the case 11, to the outer sliding surface 9 of one of the members 1, and another end of the pin 25 is fixed to the slider 27 near an end. The other end of the slider 27 is connected to an end of crank rod 29. The other end of the crank rod 29 is rotatably connected by means of a pin to a point near the circumference of a disc 31. The disc 31 is concentrically and fixedly connected to a gear which is adapted to rotate by a slide gear 33 supported by a bracket 32 mounted on the base 20. The slide gear 33 can be rotated by a motor 39 through its own shaft 34 and gears 35 and 37. When the motor 39 starts, the slider 27 repeatedly moves back and forth and slides the members 1 in the case 11.

One end of a pin 49 is fixedly connected to an end of the cutter device 23, and the other end of the pin 29 is rotatably connected to an end of a crank rod 47. The other end of the crank rod 47 is rotatably connected to an end of a pin 44. The other end of the pin 44 is fixedly connected to a disc 45 at a point near the circumference thereof. The disc 45 is connected to and rotated by a motor 43 to cause the crank rod 47 to move downwards and upwards, whereby the cutter device 23 can be repeatedly lowered and lifted.

The belt conveyor 53 is composed of a conveyor frame 54, rollers 48, 55, and 57, two tension rollers 52, a belt 50, and a motor (not shown) for driving the belt conveyor 53.

In FIG. 15, it will be understood that one end of the belt conveyor 53 is made to move upwards and downwards by a conveyor lifting device 46 mounted on the base 20, so that the roller 57 is swung about the roller 55, to avoid deformation of the spherical body as explained earlier.

The cylindrical body 15 is continuously fed from the supply device 51 and is constricted by the cutter device 23 in a direction perpendicular to the axis of the cylindrical body to shape a spherical body 21, which is fed onto the next station by the belt conveyor 53.

When the feeding speed of the cylindrical body is slow, the closing and opening of the opening 14 may be carried out even without reciprocating the cutter device. However, when the feeding speed is fast, it is preferable to move the shutter device in synchronization with the shaping of the spherical body to avoid the difficulty of FIG. 10 or the adhesion to the walls of the assembly. The movement of the cutter device 23 is such that it descends at the same speed as that of the feeding speed of the cylindrical body, and ascends after a spherical body is formed. The members are made to slide back to their original opened position during or before the ascent of the shutter device to avoid the members colliding with the cylindrical body. Repeating the aforesaid operation, the cylindrical body is continuously cut to shape spherical bodies at a high speed.

The shaped body 21 can be received by the belt conveyor 53 lifted by the conveyor lifting device 46. In the apparatus of the present invention, the conveyor lifting device 46 is adapted to alternately lower and raise the belt conveyor 53 in synchronization with the movements of the assembly of the cutter device.

Figure 16A:
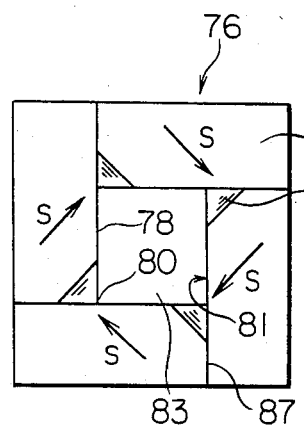
FIGS. 16(A) and 16(B) illustrate the movements of an assembly composed of four members, each a rectangular parallelopiped having a slope.
Figure 16B:
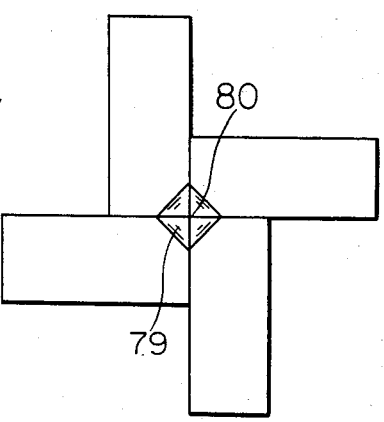
Figure 17A:
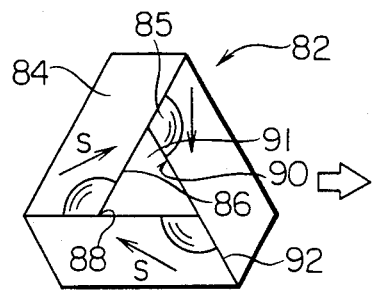
FIGS. 17(A) an 17(B) illustrate the movements of an assembly composed of three members, each a parallelopiped having a curved slope.
Figure 17B:
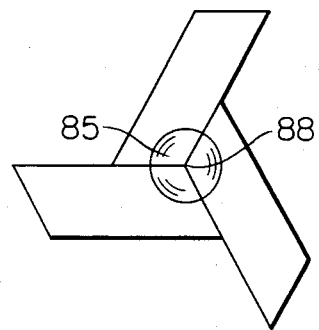

In the invention, various shaped members can be used as shown in FIGS. 16(A) and 17(B). In FIG. 16(A), an assembly 76 is composed of four rectangular parallelepiped members 77, each having a slope 79 at a corner, sliding surfaces 78 and 87, and an edge 80. Part of a sliding surface 78 of each member forms walls 81 defining an opening 83, and each member slides in a direction s. When the opening 83 is closed, the position of the members is shown in FIG. 16(B).

An assembly can be composed of three parallelopiped members, each having a curved slope 85, sliding surfaces 86 and 92, and an edge 88. Walls 90, formed by a sliding surface 86 of each member make an opening 91, and each member slides in a direction s. When the opening 91 is closed, the position of the members is shown in FIG. 17(B).

In the invention, the constriction of the cylindrical body is carried out while the contact area of the walls of the opening with the surface of the cylindrical body is gradually decreased. Therefore, no force is applied to cause the members to penetrate the body, unlike the conventional apparatus using wedge-formed blades. As a result, the filling is readily moved in the axial direction without breaking the dough crust.

Also, the members slide in a tangentially biased direction relative to the circumference of the cylindrical body. Accordingly, the dough crust is narrowed to a point at which a spherical body is shaped without exposing the filling.

Furthermore, according to the invention, a relatively simple mechanism can produce at high speed spherical bodies made of dough crust and a filling and of high quality.

I claim:

1. An apparatus for forming a shaped body composed of an outer covering layer and an inner filling, comprising:
   supply means for continuously supplying a cylindrical body composed of an outer layer of a plastic material and a central filling longitudinally in a downstream direction;
   a cutter assembly disposed downstream of said supply means having at least three ciircumferentially disposed cutter members arranged in sliding contact with each other so as to form a central opening which is openable for receiving a leading part of said cylindrical body and closable for shaping the received part into a shaped body and severing it from the remainder of said cylindrical body; and
   means for slidably moving said cutter members inwardly and outwardly of said central opening relative to each other in a direction transverse to the downstream direction of said cylindrical body so as to open and close said central opening of said cutter assembly to form each such shaped body,
   wherein said cutter members each are formed with at least two sliding surfaces, which are planar and oriented parallel to the downstream direction, and along which the adjacent sliding surfaces of the adjacent cutter members are slidable, said two sliding surfaces of each cutter member having a predetermined width and being arranged to converge inwardly toward said central opening to a tapered portion having a progressively decreasing width which is less than the width of said sliding surfaces, whereby as said cutter members are moved inwardly, said central opening is closed by the inwardly moving tapered portions of said cutter members forming a progressively decreasing contact area with the plastic outer layer of said cylindrical body so as to smoothly close the plastic outer layer over the inner filling of the resulting shaped body.

2. An apparatus of claim 1, further comprising a receiving surface disposed downstream of said cutter assembly for receiving the resulting shaped body.

3. An apparatus of claim 2, further comprising means for moving said receiving surface relatively toward the shaped body to receive it thereon in synchronism with slidably moving said cutter members to close said central opening, so that a part of the shaped body departing from said cutter assembly is smoothly shaped.

4. An apparatus of claim 1, further comprising means for moving said cutter assembly in the downstream direction at a speed comparable to the speed at which said cylindrical body moves downstream at the time said cutter members are moved inwardly, and for moving said cutter assembly back in the upstream direction during or after the time said cutter members are moved outwardly, so that a leading part of the next shaped body to be formed is smoothly shaped.

5. An apparatus for forming a shaped body composed of an outer covering layer and an inner filling, comprising:
   supply means for continuously supplying a cylindrical body composed of an outer layer of a plastic material and a central filling longitudinally in a downstream direction;
   a cutter assembly disposed downstream of said supply means having at least three circumferentially disposed cutter members arranged in sliding contact with each other so as to form a central opening which is openable for receiving a leading part of said cylindrical body and closable for shaping the received part into a shaped body and severing it from the remainder of said cylindrical body;
   means for slidably moving said cutter members inwardly and outwardly of said central opening relative to each other in a direction transverse to the downstream direction of said cylindrical body so as to open and close said central opening of said cutter assembly to form each such shaped body; and
   means for moving said cutter assembly reciprocatingly in the downstream direction and back in the upstream direction relative to said cylindrical body in synchronism with the inward and outward movement of said cutter members.

6. An apparatus of claim 5, further comprising a receiving surface disposed downstream of said cutter assembly for receiving the resulting shaped body.

7. An apparatus of claim 6, further comprising means for moving said receiving surface relatively toward the shaped body to receive it thereon in synchronism with slidably moving said cutter members to close said central opening, so that a part of the shaped body departing from said cutter assembly is smoothly shaped.

8. An apparatus of claim 5, wherein said means for moving moves said cutter assembly in the downstream direction at a speed comparable to the speed at which said cylindrical body moves downstream at the time said cutter members are moved inwardly, and moves said cutter assembly back in the upstream direction during or after the time said cutter members are moved outwardly, so that a leading part of the next shaped body to be formed is smoothly shaped.

* * * * *